United States Patent
Murray et al.

(10) Patent No.: US 7,139,848 B1
(45) Date of Patent: Nov. 21, 2006

(54) DMA PROTOCOL EXTENSION FOR PACKET-BASED TRANSFER

(75) Inventors: James Murray, Mountain View, CA (US); Jean-Didier Allegrucci, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 351 days.

(21) Appl. No.: 09/733,401

(22) Filed: Dec. 8, 2000

(51) Int. Cl.
*G06F 3/00* (2006.01)
*G06F 13/28* (2006.01)
*G06F 13/00* (2006.01)

(52) U.S. Cl. .................. 710/22; 710/24; 710/25; 710/5; 710/6

(58) Field of Classification Search ........... 710/5–7, 710/22–26, 29, 32, 58–59, 28, 33, 3, 52; 714/24, 50
See application file for complete search history.

(56) References Cited

U.S. PATENT DOCUMENTS

| | | | |
|---|---|---|---|
| 4,947,366 A * | 8/1990 | Johnson .................. | 710/3 |
| RE34,363 E | 8/1993 | Freeman, deceased | |
| 5,291,494 A * | 3/1994 | Bruckert et al. ........... | 714/24 |
| 5,333,274 A * | 7/1994 | Amini et al. ............... | 714/50 |
| 5,369,314 A | 11/1994 | Patel et al. | |
| 5,381,538 A * | 1/1995 | Amini et al. ............... | 710/22 |
| 5,402,014 A | 3/1995 | Ziklik et al. | |
| 5,448,493 A | 9/1995 | Topolewski et al. | |
| 5,481,756 A * | 1/1996 | Kanno ....................... | 710/22 |
| 5,504,875 A | 4/1996 | Mills et al. | |
| 5,651,138 A | 7/1997 | Le et al. | |
| 5,655,151 A * | 8/1997 | Bowes et al. ............... | 710/28 |
| 5,713,044 A * | 1/1998 | Gillespie et al. ........... | 710/22 |
| 5,752,078 A * | 5/1998 | Delp et al. ................. | 710/52 |
| 5,774,684 A | 6/1998 | Haines et al. | |
| 5,809,335 A * | 9/1998 | Kamiya ...................... | 710/23 |
| 5,844,854 A | 12/1998 | Lee | |
| 5,883,525 A | 3/1999 | Tavana et al. | |
| 5,884,100 A * | 3/1999 | Normoyle et al. .......... | 710/52 |
| 5,903,775 A * | 5/1999 | Murray ....................... | 710/33 |
| 5,963,050 A | 10/1999 | Young et al. | |
| 6,026,230 A * | 2/2000 | Lin et al. .................... | 703/13 |
| 6,085,317 A | 7/2000 | Smith | |
| 6,192,492 B1 * | 2/2001 | Masiewicz et al. ......... | 710/25 |
| 6,199,121 B1 * | 3/2001 | Olson et al. ................ | 710/24 |
| 6,298,396 B1 * | 10/2001 | Loyer et al. ................ | 710/22 |
| 6,467,009 B1 | 10/2002 | Winegarden et al. | |
| 2003/0028408 A1 * | 2/2003 | RuDusky .................... | 705/8 |

* cited by examiner

*Primary Examiner*—Kim Huynh
*Assistant Examiner*—Joshua D. Schneider
(74) *Attorney, Agent, or Firm*—Blakely, Sokoloff, Taylor & Zafman; William L. Paradise; John J. King (57) ABSTRACT

According to one embodiment a system is described. The system includes a direct memory access (DMA) controller and an input/output (I/O) device coupled to the DMA controller. The DMA controller is adaptable to operate in a normal mode and a descriptor mode.

18 Claims, 10 Drawing Sheets

DMA PROTOCOL EXTENSION FOR PACKET-BASED TRANSFER

FIELD OF THE INVENTION

The present invention relates to integrated circuits, and more specifically, to executing direct memory access (DMA) transfers.

BACKGROUND

DMA controllers are used in computer systems for moving blocks of data from one location to another location. Consequently, the system processor is relieved of the need to generate a long sequence of addresses to accomplish the transfer of data. Typically, the data transferred is a large block of data that begins at a source address and is moved to a destination beginning at a destination address. The DMA controller is started by an event responsive to which the DMA controller generates addresses of a source location and of a destination location wherein data is transferred.

Figure 4A:
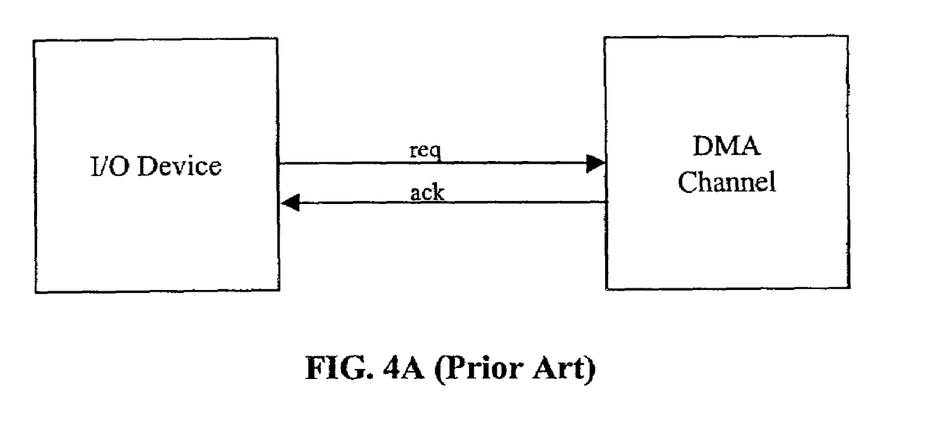
FIG. 4A is a block diagram of an exemplary input/output (I/O) device coupled to a DMA controller.

FIG. 4A is a block diagram of an exemplary DMA controller coupled to an input/output (I/O) device. The DMA controller is coupled to the I/O device via a request signal line and an acknowledge signal line. Typically, the I/O device requests the service of the DMA controller by asserting the request signal line. In response, the DMA controller asserts the acknowledge signal line when the DMA controller is able to service the device.

However, before the acknowledge is transmitted and data is transferred to (or from) the I/O device, the system processor, or other bus master, must typically set up the DMA transfer parameters and mode of operations by writing directly to the control registers of the controller. Therefore, the processor is required to update the registers prior to each subsequent transfer. Using the system processor to continuously set up the DMA controller is not efficient. As a result, a more efficient system and method for executing DMA transfers is desired.

SUMMARY

According to one embodiment a system is described. The system includes a direct memory access (DMA) controller and an input/output (I/O) device coupled to the DMA controller. The DMA controller is adaptable to terminate a DMA transfer before a terminal count is reached. Further the DMA controller is adaptable to re-transmit data.

BRIEF DESCRIPTION OF THE DRAWINGS

A better understanding of the present invention can be obtained from the following detailed description in conjunction with the following drawings, in which.

DETAILED DESCRIPTION

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Figure 1:
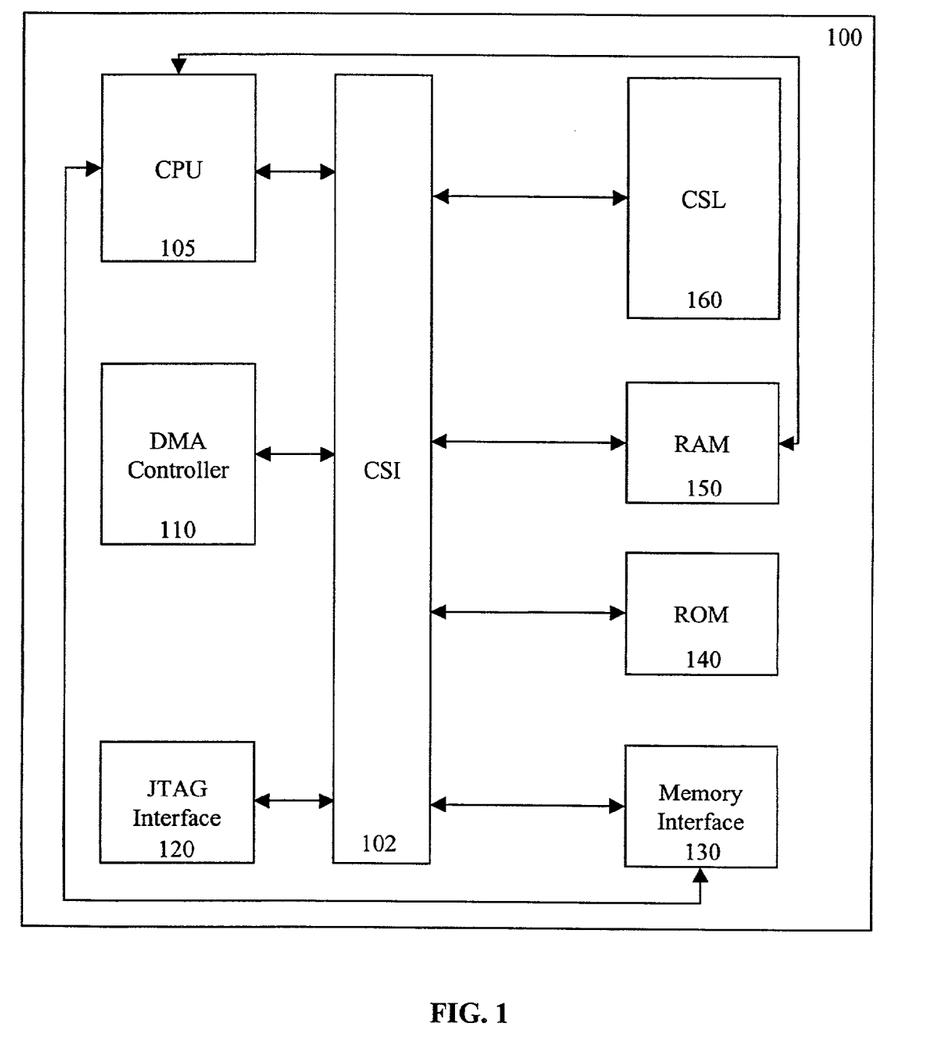
FIG. 1 is a block diagram of one embodiment of a system.

FIG. 1 is a block diagram of one embodiment of a system 100. System 100 includes a configurable system interconnect (CSI) 102, a central processing unit (CPU) 105, a direct memory access (DMA) controller 110 and a Joint Test Action Group (JTAG) interface 120. In addition, system 100 includes a memory interface 130, a read only memory (ROM) 140, a random access memory (RAM) 150 and configurable system logic (CSL) 160. According to one embodiment, the components of system 100 are all included on the same semiconductor chip.

CSI 102 is a dedicated system bus for connecting CPU 105 to the other components within system 100. In addition, CSI 102 provides a synchronous interface for system 100 components. Further, CSI 102 includes address and data paths, a clock and control signals. According to one embodiment, CSI 102 is a 32-bit bus that supports multiple access modes. In such an embodiment, devices in system 100 may be configured to transmit 32-bit, 16-bit or 8-bit packets of data via CSI 102.

CPU 105 is coupled to CSI 102 and executes sequences of instructions received from other components within system 100. According to one embodiment, CPU 105 is an ARM7TDMI processor developed by ARM of Cambridge, Mass. Alternatively, other processors may be used.

DMA controller 110 is coupled to CSI 102 and controls direct memory accesses between memory devices within system 100 (e.g., RAM 150 and ROM 140), and input/output (I/O) devices, without using CPU 105. DMA transfers typically include a number of transactions from an I/O device to a memory location, or vice versa. JTAG interface 120 is adaptable to test the boundaries of system 100. According to one embodiment, JTAG interface 120 operates as a master device of CSI 102 and has access to all system resources in order to debug system 100. In a further embodiment, JTAG interface 120 converts serial bit streams into parallel registers whose contents are placed on the address, data and command busses in order to emulate CSI 102 transactions.

Memory interface 130 provides a connection between CSI 102 and one or more external memory devices (not shown).

ROM 140 is also coupled to CSI 102. ROM 140 is used to initialize system 100 upon startup. Further, ROM 140 may be configured to instruct CPU 102 to fetch and execute code segments from external memory devices and other interfaces. One of ordinary skill in the art will appreciate that other non-volatile memory devices (e.g., flash memory) may be used instead of a ROM.

RAM 140 stores sequences of instructions that are executed by CPU 105. According to one embodiment, RAM 140, CPU 105 and CSL 160 are connected through CSI 102 such that devices residing in the matrices of CSL 160 may effectively access RAM 140 using DMA controller 110, in addition to access by CPU 105. CSL 160 comprises programmable logic that is coupled to CPU 105, RAM 150 and other system 100 components via CSI 102. According to one embodiment, CSL 160 includes an array of programmable logic tiles that correspond to design units of the physical layout of CSL 160. CSL 160 may be used to implement various device components such as Universal Asynchronous Receiver Transmitters (UARTs), registers, memories, etc. In a further embodiment, CSL 160 may include one or more I/O devices.

Figure 2:
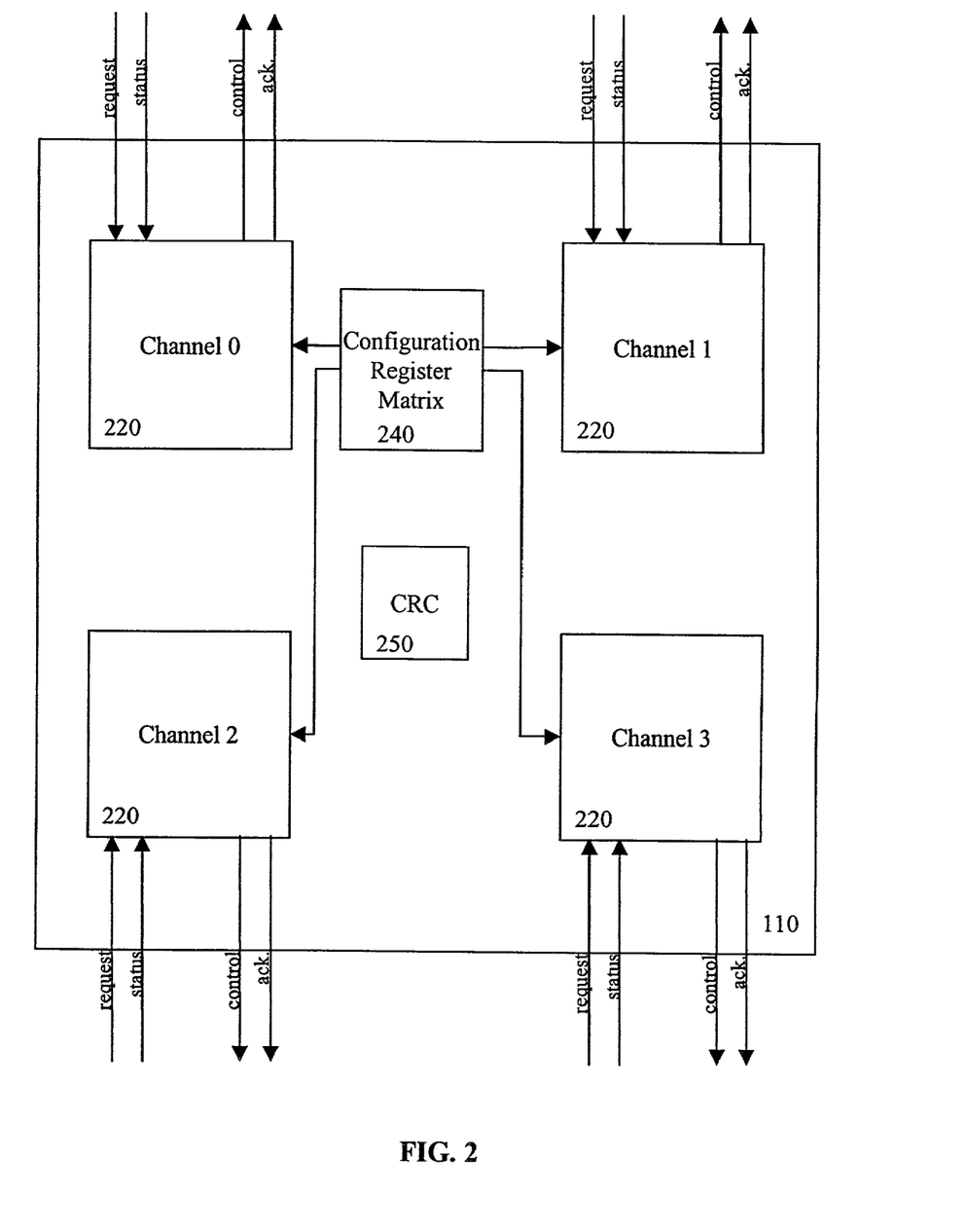
FIG. 2 is a block diagram of one embodiment of a direct memory access (DMA) controller.

According to one embodiment, DMA controller 110 is configured to terminate a DMA transfer before a terminal count has been reached. In addition, DMA controller 110 is configured to re-transmit data upon request by a connected I/O device. FIG. 2 is a block diagram of one embodiment of DMA controller 110. DMA controller 110 includes multiple channels 220, a configuration register matrix 240 and a Cyclical Redundancy Checker (CRC) 250.

According to one embodiment, four DMA channels 220 (e.g., channels 0–3) are included within DMA controller 110. However, one of ordinary skill in the art will appreciate that other quantities of channels 220 may be included within DMA controller 110. DMA channels 220 are system pathways used by devices within system 100 to transfer data directly to and from RAM 150, ROM 140 or external memory devices coupled to memory interface 130. In one embodiment, each channel 220 is coupled to an I/O device via CSI 102. As described above, the I/O devices may be programmable logic implementations within CSL 160. In yet a further embodiment, REQUEST, ACKNOWLEDGE, STATUS and CONTROL wires are use to control data transfers between channel 220 and I/O devices.

Configuration register matrix 240 stores DMA configuration data received from CPU 105 or any other bus master (e.g., JTAG interface 120). The data stored in register 240 includes information used for executing a DMA transfer. For example, register 240 may store the start and stop memory addresses of data to be transferred to or from an I/O device, as well as the size of the transfer.

CRC 250 uses an error checking technique used to ensure the accuracy of transmitted data. According to one embodiment, transmitted messages are divided into predetermined lengths which, used as dividends, are divided by a fixed divisor. The remainder of the calculation is appended onto and sent with the message. The remainder is recalculated at the receiving end. If it does not match the transmitted remainder, an error is detected.

Figure 3:
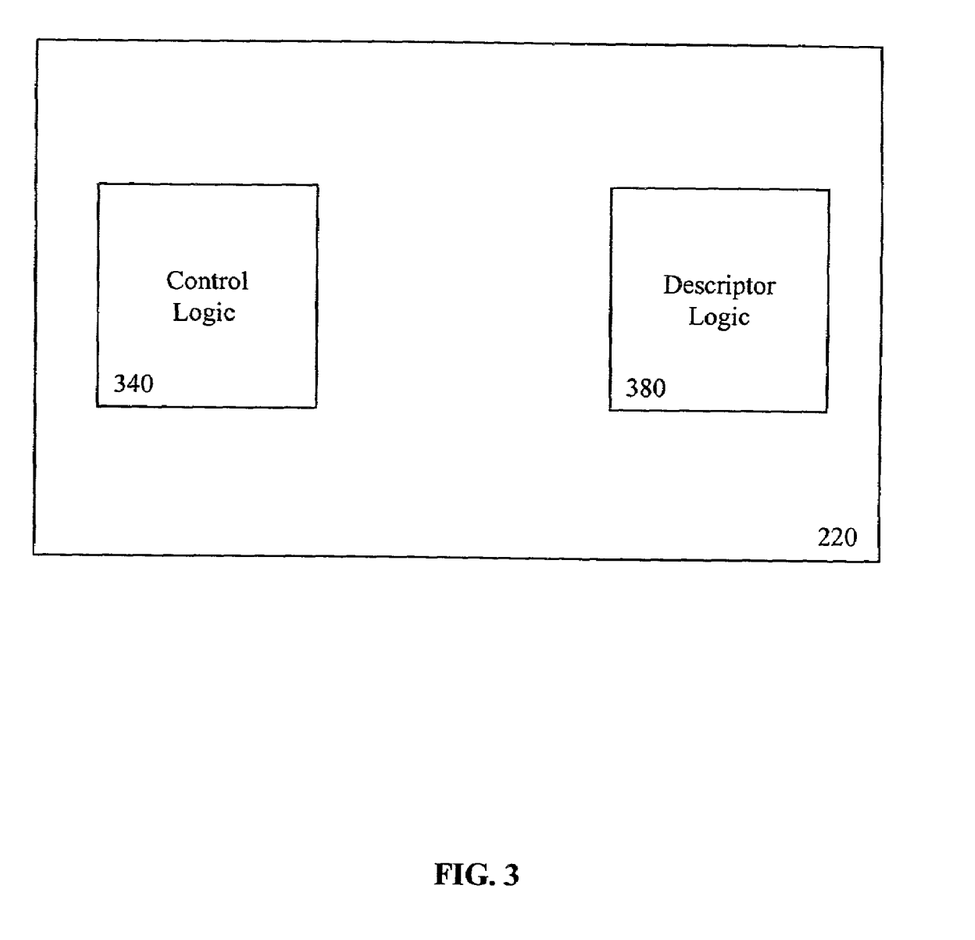
FIG. 3 is a block diagram of one embodiment of a DMA channel.

FIG. 3 is a block diagram of one embodiment of DMA channel 220. DMA channel 220 includes control logic 340 and descriptor logic 380. Control logic 340 controls the transfer process within a DMA channel 220. For example, control logic 340 coordinates the set up of register 240 prior to the execution of a transfer. Descriptor logic 380 is used to coordinate DMA transfers in a descriptor mode. According to one embodiment, descriptor logic 380 receives control information used to carry out a DMA transfer from a descriptor table in memory. The descriptor table may be stored in RAM 150 or in another memory device coupled to memory interface 130. The control information received at descriptor logic 380 is interpreted and programmed into configuration register matrix 240.

Figure 4B:
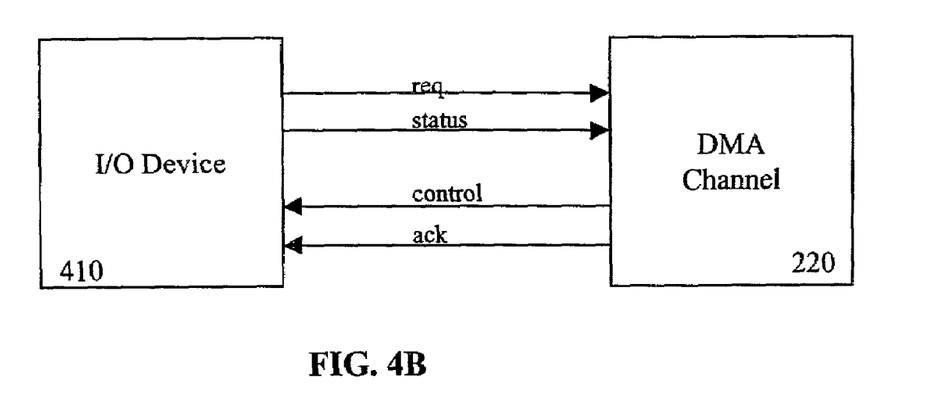
FIG. 4B is a block diagram of one embodiment of an I/O device coupled to a DMA channel.

FIG. 4B is a block diagram of one embodiment of an I/O device 410 coupled to a DMA channel 220. As described above, I/O device 410 and DMA channel 220 are coupled via REQUEST, ACKNOWLEDGE, STATUS and CONTROL wires. According to one embodiment, the STATUS is paired with the REQUEST component to signal requests from I/O device 410 to DMA channel 220. As a result, I/O device 410 is capable of making three different types of requests to channel 220.

In addition to a regular request for a transfer of data, I/O device 410 may request for a retransmission of data as well as request an early termination of data. Similarly, the CONTROL and ACKNOWLEDGE components are paired. Tables 1 and 2 below illustrate one embodiment of signal values needed for the different request types and their respective acknowledge signals.

TABLE 1

| REQUEST | STATUS | ACTION |
|---|---|---|
| 0 | 0 | No Request |
| 1 | 0 | Request (Regular) |
| 0 | 1 | Retransmit Request |
| 1 | 1 | Early Termination Request |

TABLE 2

| ACKNOWLEDGE | CONTROL | ACTION |
|---|---|---|
| 0 | 0 | No Acknowledge |
| 1 | 0 | Acknowledge (Regular) |
| 0 | 1 | Retransmit Acknowledge |
| 1 | 1 | Early Termination Acknowledge |

According to one embodiment, DMA controller may operate in either a normal mode or a descriptor mode.

Normal Mode

Figure 5:
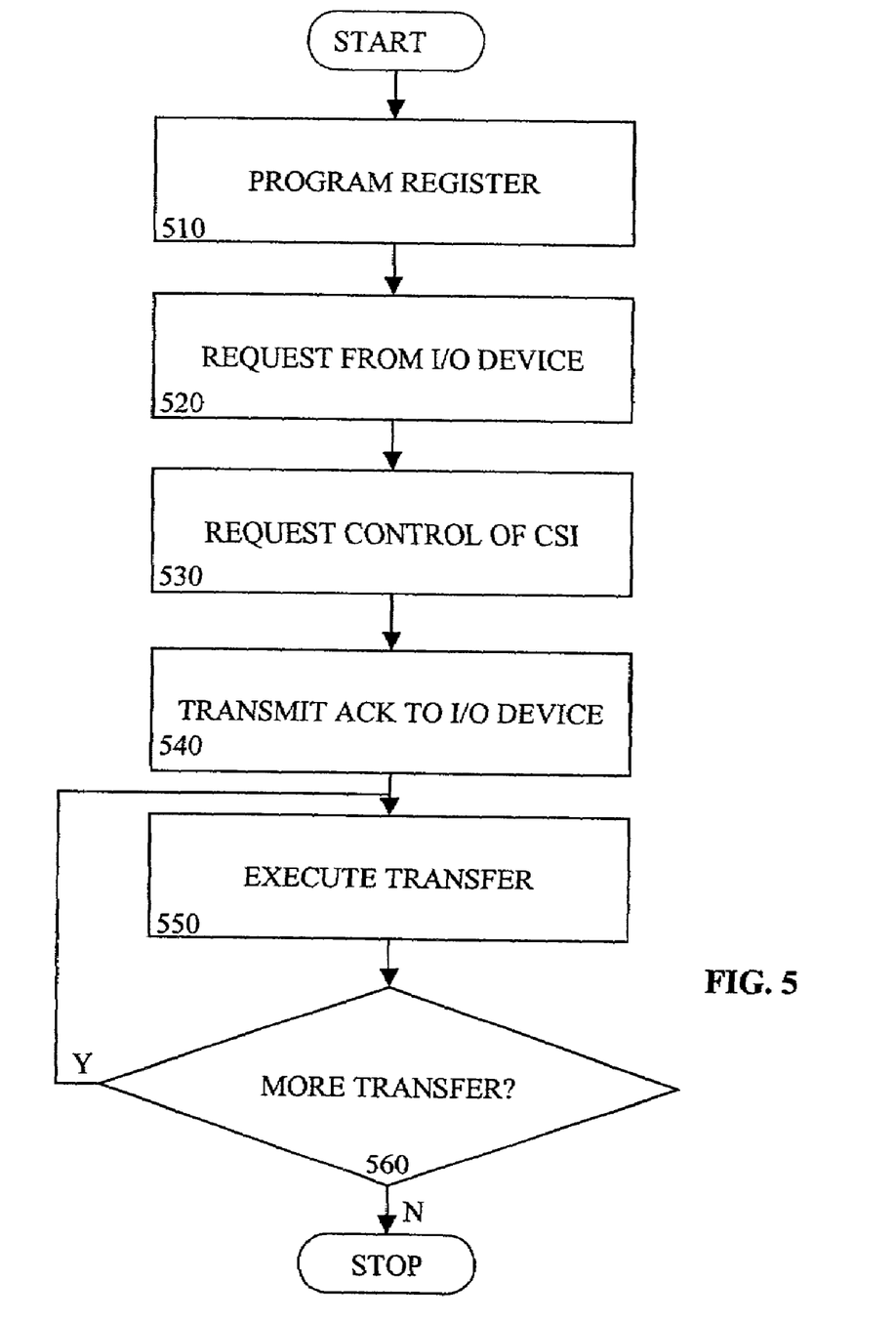
FIG. 5 is a flow diagram for one embodiment of the process carried out upon receiving a regular request at a DMA channel.

FIG. 5 is a flow diagram for one embodiment of the process carried out by DMA controller 110 upon receiving a regular request at a DMA channel 220 from an I/O device 410. At process block 510, CPU 105 (or other bus master), sets up the DMA transfer parameters. In particular, control logic 340 is used to program register 240 with a sequence of commands. The sequence of commands may include information such as the mode of operation, the start address of the first command and last address of the last command. In addition, the commands may include a count that maintains an accounting of the number of transfers to be carried out.

At process block 520, a regular request (e.g., REQUEST=1 and STATUS=0) is received at a DMA channel 220 from an I/O device requesting service. At process block 530, DMA controller 110 requests access of CSI 102. At process block 540, DMA controller 110 transmits a regular acknowledge signal (e.g., ACKNOWLEDGE=1 and CONTROL=0) to I/O device 410. At process block 550, data is transmitted over CSI 102 to (or from) I/O device 410 according to the first command. At process block 560, it is determined whether register 240 contains more commands.

If there are more commands stored in register 240, control is returned to process block 560. Otherwise, the process is completed.

If DMA controller 110 is operating in the normal mode and receives a retransmit request signal (e.g., REQUEST=0 and STATUS=1) during a transfer, DMA channel 220 re-executes the current transfer. A retransmit request signal allows I/O device 410 to signal DMA controller 110 to retransmit the current active transfer without any action by CPU 105 being needed. In one embodiment, a retransmit request signal may be received if I/O device 410 determines that an error in transmission has occurred.

Figure 6:
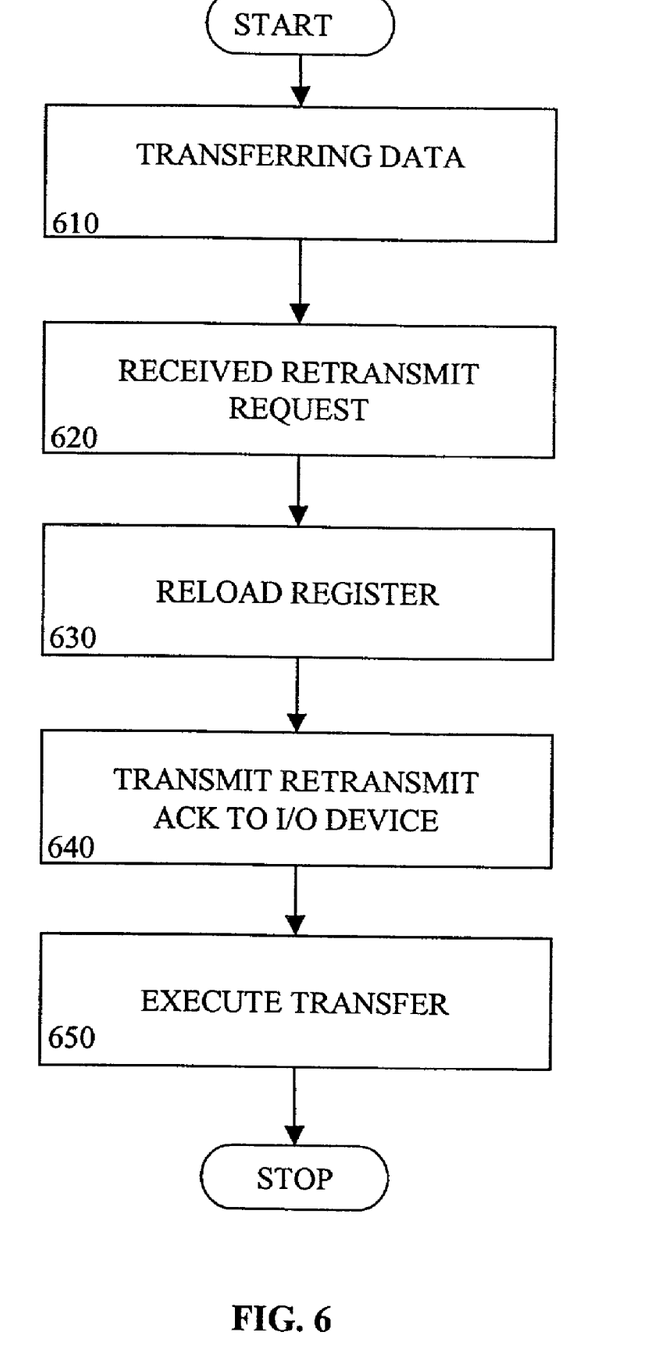
FIG. 6 is a flow diagram of one embodiment of the process carried out by a DMA controller upon receiving a retransmit request from an I/O device.

FIG. 6 is a flow diagram of one embodiment of the process carried out by DMA controller 110 upon receiving a retransmit request signal from I/O device 410. At process block 610, DMA controller 110 is executing a transfer of data. At process block 620, channel 220 receives a retransmit request signal from I/O device 410. At process block 630, configuration register matrix 240 is reloaded by control logic 340. As a result, is it not necessary for CPU 105 to update control logic 340 with the next DMA transfer until the current DMA transfer has been completed. At process block 640, DMA controller 110 transmits a retransmit acknowledge signal (e.g., ACKNOWLEDGE=0 and CONTROL=1) to I/O device 410. At process block 650, the transfer of data is again commenced from the beginning. Again, notice that the retransmission process does not require intervention by CPU 105.

If DMA controller 110 is operating in the normal mode and receives an early termination request signal (e.g., REQUEST=1 and STATUS=1) during a transfer, DMA channel 220 terminates the current transfer. An early termination request signal may be received in cases where the exact amount of incoming data is not known in advance and I/O device 410 determines that all of the required data has been received.

Figure 7:
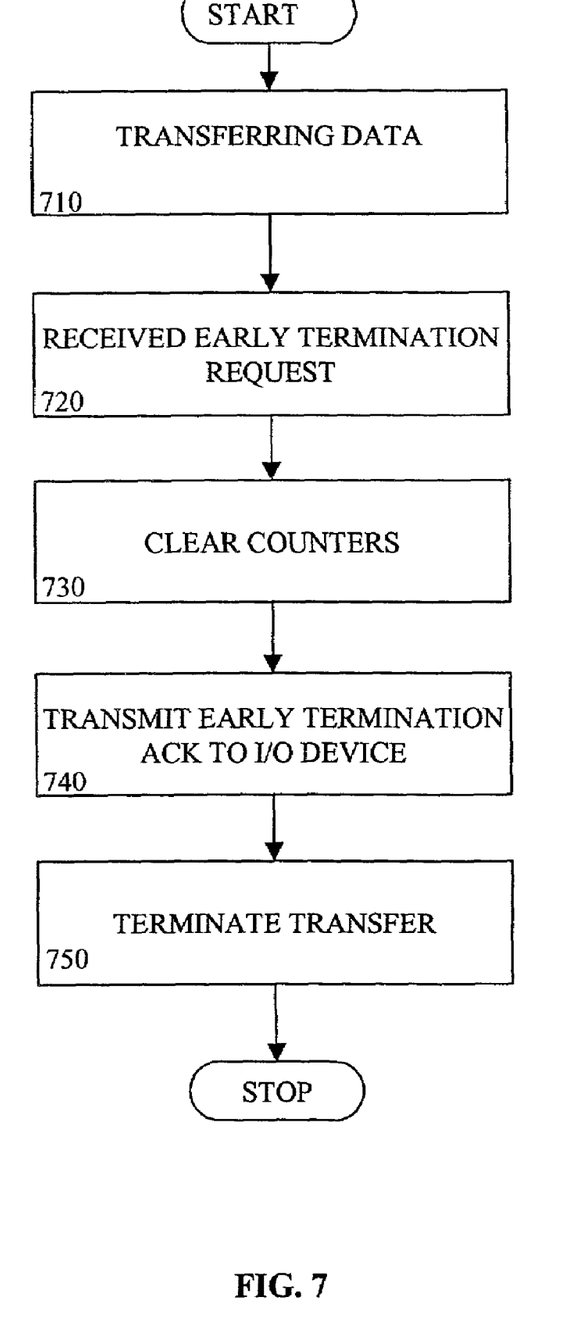
FIG. 7 is a flow diagram of one embodiment of the process carried out by a DMA controller upon receiving an early termination request from an I/O device.

FIG. 7 is a flow diagram of one embodiment of the process carried out by DMA controller 110 upon receiving an early termination request signal from I/O device 410. At process block 710, DMA controller 110 is executing a transfer of data. At process block 720, channel 220 receives an early termination request signal from I/O device 410. At process block 730, DMA channel 220 clears the current transfer counter (not shown). According to one embodiment, the transfer counter resides within configuration register matrix 240. At process block 740, DMA controller 110 transmits an early termination acknowledge signal (e.g., ACKNOWLEDGE=1 and CONTROL=1) to I/O device 410. At process block 750, the transfer is terminated.

Descriptor Mode

Figure 8:
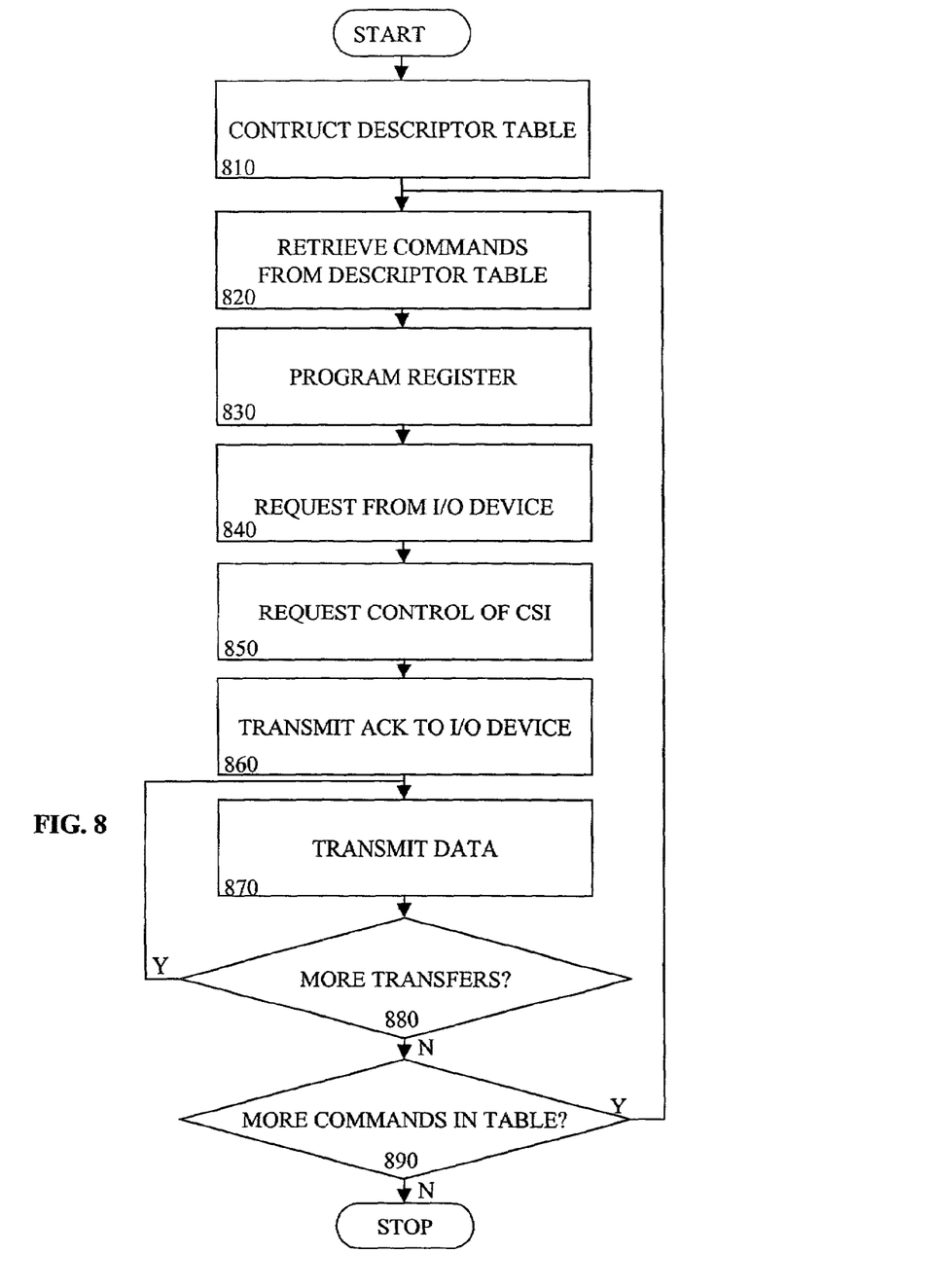
FIG. 8 is a flow diagram for one embodiment of the process carried out by a DMA controller upon receiving a regular request signal while operating in the descriptor mode.

The descriptor mode features a series of single transfers wherein DMA controller 110 automatically deduces the next transfer that is to be performed. The descriptor mode releases CPU 105 from the task of having to continuously monitor and manage DMA transfers. FIG. 8 is a flow diagram for one embodiment of the process carried out by DMA controller 110 upon receiving a regular request signal at a DMA channel 220 while operating in the descriptor mode.

At process block 810, CPU 105, or other bus master, constructs a descriptor table 380 in memory (e.g., RAM 150). At process block 820, DMA controller 220 retrieves a command at the beginning of the descriptor table. At process block 830, the retrieved command is programmed into configuration register matrix 240 in conjunction with descriptor logic 380. At process block 840, a regular request signal is received at a DMA channel 220. At process block 850, DMA controller 110 requests access of CSI 102. At process block 860, DMA controller 110 transmits a regular acknowledge signal to I/O device 410.

At process block 870, data is transmitted to (or received from) I/O device 410 over CSI 102. At process block 880, it is determined whether register 240 contains more transfer commands. If there are more commands stored in register 240, control is returned to process block 870 where more data is transmitted. If there are no more commands stored in register 240, it is determined whether descriptor table 380 contains more commands. If there are more commands stored in descriptor table 380, control is returned to process block 820 where the next command is retrieved, process block 890. Otherwise, the process is completed.

Figure 9:
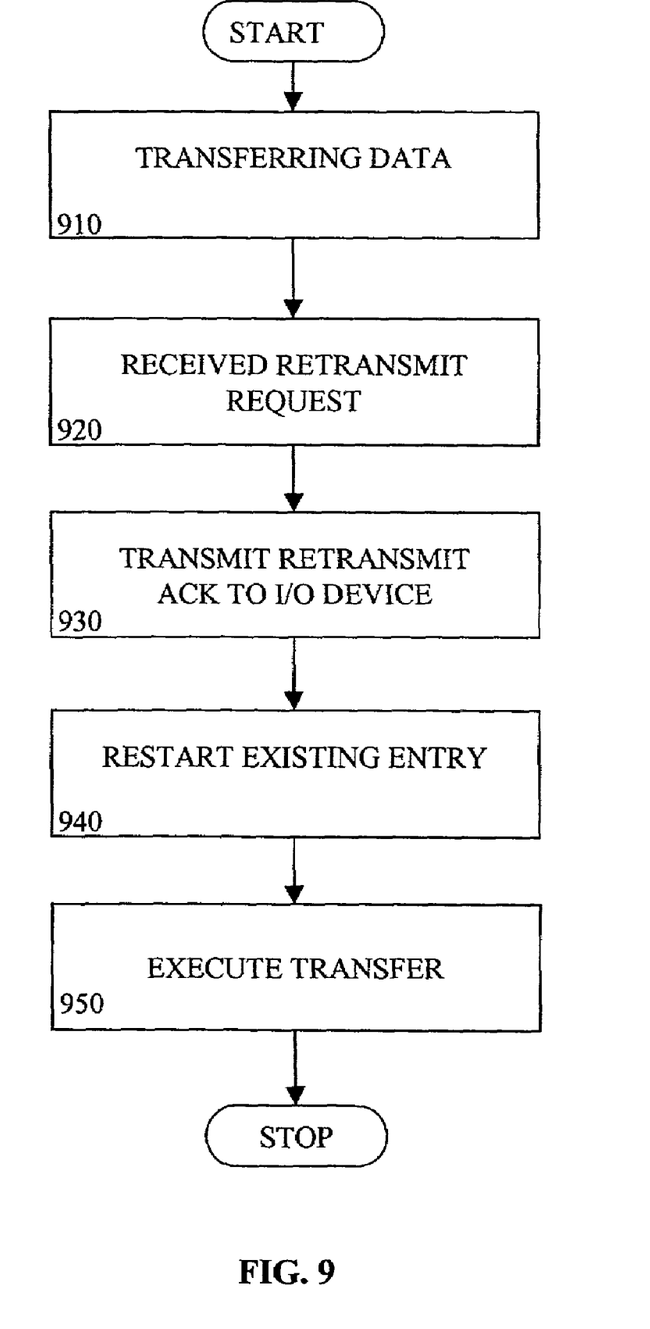
FIG. 9 is a flow diagram of one embodiment of the process carried out by a DMA controller upon receiving a retransmit request signal from an I/O device while operating in a descriptor mode.

While operating in the descriptor mode, DMA controller 110 may receive a retransmit request signal. FIG. 9 is a flow diagram of one embodiment of the process carried out by DMA controller 110 upon receiving a retransmit request signal from I/O device 410. At process block 910, DMA controller 110 is executing a transfer of data. At process block 920, channel 220 receives a retransmit request signal from I/O device 410.

At process block 930, DMA controller 110 transmits a retransmit acknowledge signal (e.g., ACKNOWLEDGE=0 and CONTROL=1) to I/O device 410. At process block 940, DMA controller 110 will restart the existing descriptor entry since a copy of the current descriptor command is stored in configuration register matrix 240. At process block 950, the transfer of data is again commenced from the beginning.

Figure 10:
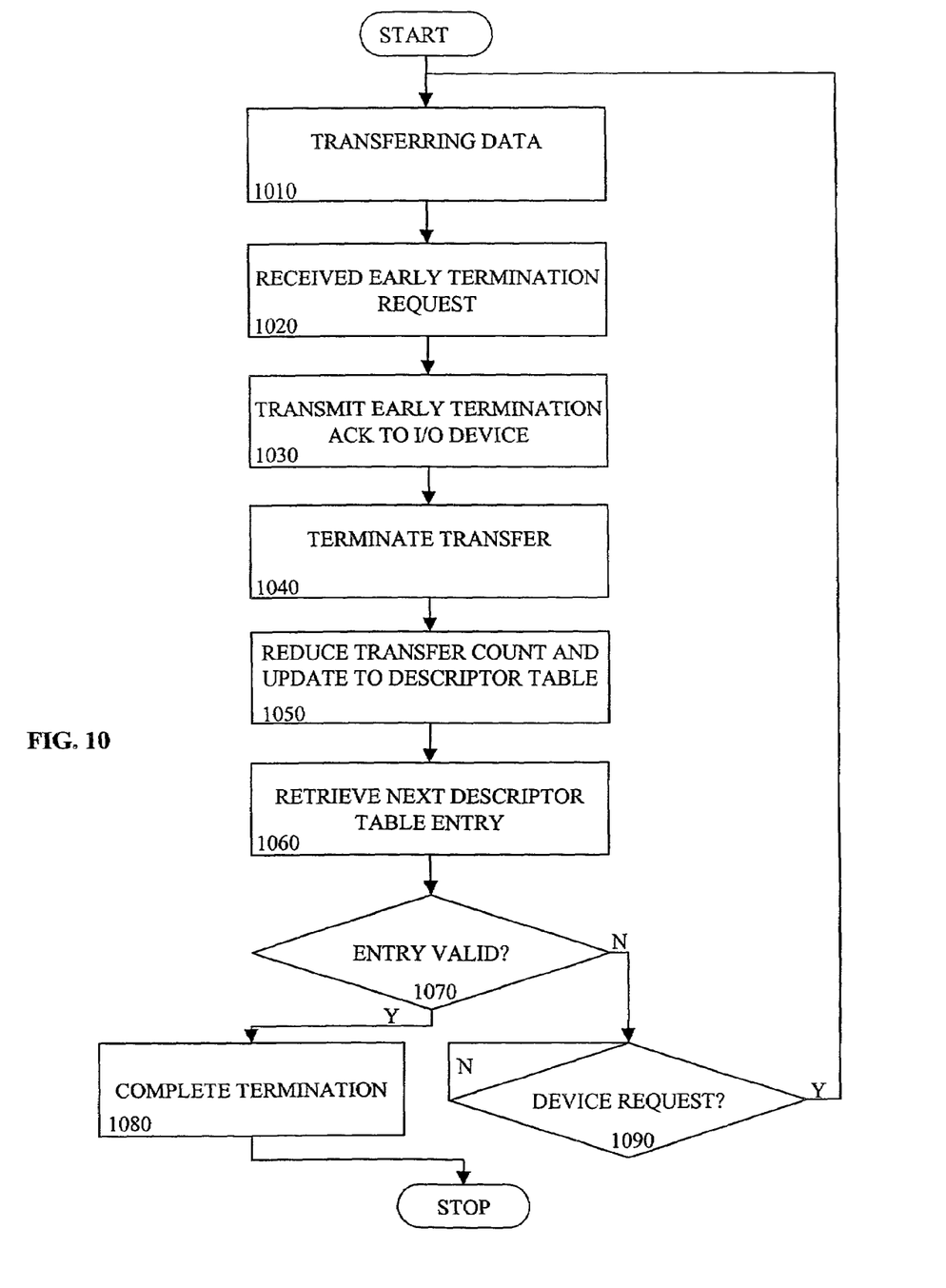
FIG. 10 is a flow diagram of one embodiment of the process carried out by a DMA controller upon receiving an early termination signal from an I/O device while operating in a descriptor mode.

While operating in the descriptor mode, DMA controller 110 may receive an early termination signal. FIG. 10 is a flow diagram of one embodiment of the process carried out by DMA controller 110 upon receiving an early termination request signal from I/O device 410. At process block 1010, DMA controller 110 is executing a transfer of data. At process block 1020, channel 220 receives an early termination request signal from I/O device 410.

At process block 1030, DMA controller 110 transmits an early termination acknowledge signal to I/O device 410. At process block 1040, DMA channel 220 terminates the transfer associated with the current descriptor entry. At process block 1050, DMA channel 220 updates the reduced transfer count into the descriptor table in memory. In one embodiment, the descriptor table includes a field entry that indicates the amount of data that is to be transferred. This field is updated after the transfer with the amount of data that has actually been transferred.

At process block 1060, DMA controller retrieves the next entry in descriptor table 380. At process block 1070, it is determined whether the next descriptor table entry is valid. If the next descriptor table entry is valid, the transfer of data is terminated, process block 1080. However, if the next descriptor table entry is invalid, it is determined whether I/O device 410 is signaling another request, process block 1090. If I/O device 410 is signaling another request, control is returned to process block 1010 where data is transferred. If I/O device 410 is not signaling another request, control is returned to process block 1090 where it is determined whether I/O device 410 is signaling another request.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A system comprising:
   configurable system logic having programmable logic;
   a direct memory access (DMA) controller adapted to operate in a descriptor mode;
   a configurable system interconnect coupled between the configurable system logic and the DMA controller;
   an input/output (I/O) device coupled to the DMA controller by way of the configurable system interconnect, wherein the I/O device is implemented in the programmable logic and the DMA controller terminates a DMA transfer and clears a current transfer counter before a terminal count is reached upon receiving an early termination request signal from the I/O device, and wherein the DMA controller sends an acknowledge signal to the I/O device in response to receiving the early termination request signal; and
   a descriptor table storing commands to carry out a transfer, the descriptor table being updated with a reduced transfer count in response to receiving the early termination request signal from the I/O device when the DMA controller is operating in the descriptor mode.

2. The system of claim 1 wherein the DMA controller re-executes a DMA transfer with the I/O device upon receiving a retransmit request signal from the I/O device.

3. The system of claim 1 further comprising:
   a central processing unit (CPU) coupled to the system interconnect; and
   a memory device coupled to the system interconnect.

4. The system of claim 1 wherein the DMA controller comprises a first channel coupled to the I/O device to facilitate the transfer of data.

5. The system of claim 4 wherein the DMA controller further comprises a register, coupled to the channel, to store configuration data.

6. The system of claim 5 wherein the DMA controller further comprises error checking logic.

7. The system of claim 4 wherein the channel comprises control logic to control the transfer process within the first channel.

8. A system comprising:
   configurable system logic having programmable logic;
   a direct memory access (DMA) controller adapted to operate in a descriptor mode;
   a configurable system interconnect coupled between the configurable system logic and the DMA controller;
   a descriptor table storing commands to carry out a transfer of data with the DMA controller; and
   an input/output (I/O) device coupled to the DMA controller, wherein the I/O device is implemented in the programmable logic and the DMA controller re-executes a DMA transfer of the data associated with a current descriptor entry stored in the descriptor table from the beginning with the I/O device upon receiving a retransmit request signal from the I/O device, and wherein the DMA controller sends an acknowledge signal to the I/O device in response to receiving the retransmit request signal and the transmission of the data associated with the current descriptor entry stored in the descriptor table is restarted.

9. The system of claim 8 wherein the DMA controller comprises a first channel coupled to the I/O device to facilitate data transfers.

10. The system of claim 9 wherein the DMA controller further comprises a register, coupled to the channel, to store configuration data.

11. The system of claim 10 wherein the DMA controller further comprises error checking logic.

12. The system of claim 9 wherein the channel comprises control logic to control the transfer of data.

13. A method comprising:
   configuring a first device in programmable logic of an integrated circuit;
   coupling the first device to a configurable system interconnect;
   transferring data between the first device and a second device under control of a direct memory access (DMA) controller by way of the configurable system interconnect;
   storing commands in a descriptor table to carry out a transfer of data between the first device and the second device;
   receiving a request signal at the DMA controller from the first device indicating a request by the first device to re-transmit the data between the first device and the second device;
   transmitting an acknowledge signal from the DMA controller to the first device in response to receiving the request by the first device to re-transmit the data; and
   re-transferring the data associated with a current descriptor entry stored in the descriptor table from the beginning between the first device and the second device.

14. The method of claim 13 further comprising reloading configuration registers within the DMA controller prior to transmitting the acknowledge signal to the first device.

15. A method comprising:
   configuring a first device in programmable logic of an integrated circuit;
   coupling the first device to a configurable system interconnect;
   storing commands in a descriptor table to carry out a transfer of data between the first device and a second device;
   transferring data between the first device and the second device under control of a direct memory access (DMA) controller by way of the configurable system interconnect;
   receiving a request signal at the DMA controller from the first device indicating a request by the first device to terminate the transfer of data between the first device and the second device;
   erasing appropriate DMA controller information in order to restart the transfer of data between the first device and the second device;
   transmitting an acknowledge signal from the DMA controller to the first device in response to receiving the request by the first device to terminate the transfer of data;
   terminating the transfer of data between the first device and the second device; and
   updating the descriptor table with a reduced transfer count in response to receiving the request by the first device to terminate the transfer of data when the direct memory access controller is operating in the descriptor mode.

16. The method of claim 15 wherein the erasing comprises, clearing a counter within the DMA controller prior to transmitting the acknowledge signal to the first device.

17. The method of claim 15 further comprising:
receiving a second request signal at the DMA controller from the first device indicating a request by the first device to re-transmit the data between the first device and the second device;
transmitting a second acknowledge signal from the DMA controller to the first device; and
re-transferring the data between the first device and the second device according to the first set of commands.

18. The method of claim 15 further comprising:
receiving a second request signal at the DMA controller from the first device indicating a request by the first device to re-transmit the data between the first device and the second device;
transmitting a second acknowledge signal from the DMA controller to the first device; and
terminating the transfer of data between the first device and the second device.

* * * * *